United States Patent

Steinberg et al.

[15] 3,660,706
[45] May 2, 1972

[54] MEANS FOR SECURING PLANAR MEMBER TO CATHODE RAY TUBE FACEPLATE

[72] Inventors: David R. Steinberg; William T. Sutton, both of Raleigh, N.C.

[73] Assignee: Corning Glass Works, Corning, N.Y.

[22] Filed: Nov. 16, 1970

[21] Appl. No.: 89,769

[52] U.S. Cl. .............................313/64, 313/83, 313/92 R, 313/258, 313/92 LF
[51] Int. Cl. ...............H01j 29/02, H01j 29/20, H01j 31/08
[58] Field of Search ............313/85 S, 92 PD, 92 LF, 65 LF, 313/83, 64

[56] References Cited

UNITED STATES PATENTS 3,363,129  1/1968  De France et al. ................313/92 PD Primary Examiner—Robert Segal
Attorney—Clarence R. Patty, Jr., Walter S. Zebrowski and William J. Simmons, Jr.

[57] ABSTRACT

A planar member such as a phosphor coated fiber optic plate, having a thermal coefficient of expansion that is incompatible with that of a cathode ray tube faceplate, is accurately supported a precise distance from the inner surface of the faceplate by a plurality of glass posts having slots in which the peripheral portion of the fiber optic plate is disposed. A spring contact member affixed to at least one glass post applies a holding force to the fiber optic plate and makes electrical contact between the plate and a conductive coating on the inside of the tube envelope.

10 Claims, 4 Drawing Figures

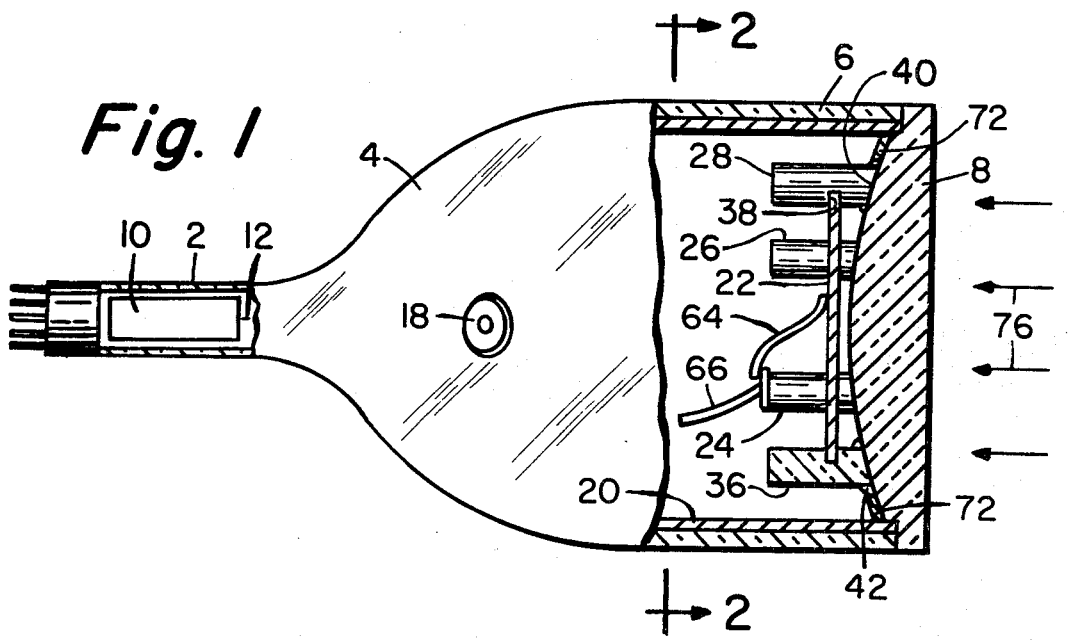
Fig. 1
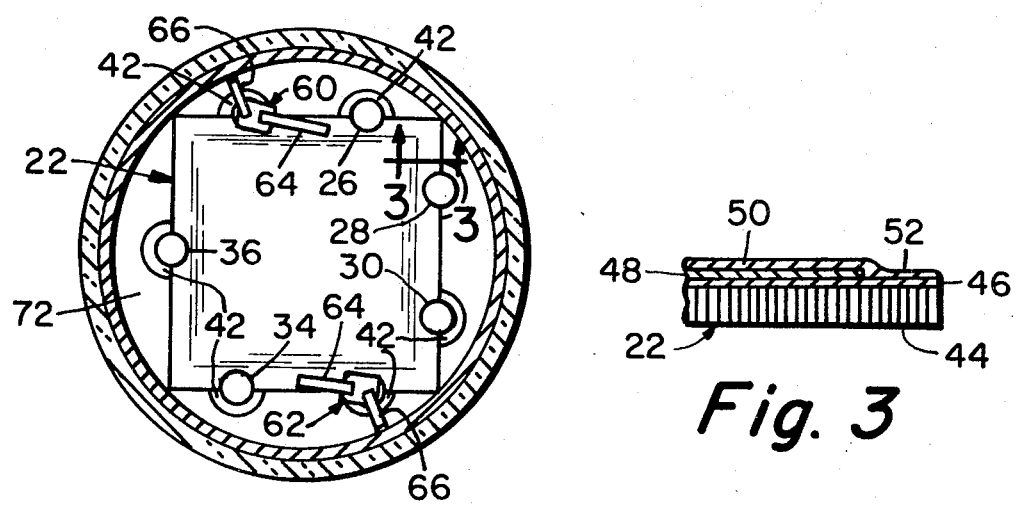
Fig. 2
Fig. 3
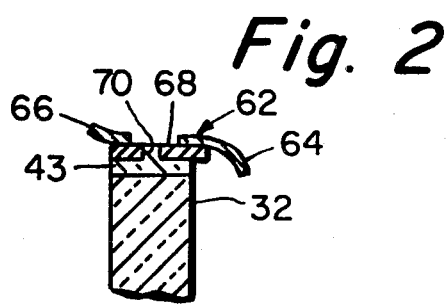
Fig. 4
INVENTORS.
David R. Steinberg
William T. Sutton
BY
*William J. Simmons Jr*
ATTORNEY 3,660,706

MEANS FOR SECURING PLANAR MEMBER TO CATHODE RAY TUBE FACEPLATE

BACKGROUND OF THE INVENTION

This invention relates to means for mounting a planar member in the path of an electron beam within a cathode ray tube and more particularly to means for accurately mounting a phosphor coated electron beam target with respect to a cathode ray tube faceplate.

It is often desirable to dispose within a cathode ray tube screens, masks, targets, or like members, the thermal expansion coefficients of which are not compatible with that of the envelope glass. In some instances it is not advisable to directly seal the member to the envelope or to the faceplate.

One such member, the thermal coefficient of expansion of which is not compatible with that of the tube envelope, is a fiber optic plate. U.S. Pat. No. 3,335,310 issued Aug. 8, 1967 to R. J. Ney discloses a typical example of the manner in which a fiber optic faceplate is sealed to a tube envelope. A thin metal annulus or cylinder is sealed to one end of the tube envelope and a thin metal flange or frame member having a concentric opening therein for receiving the fiber optic faceplate is welded to the metal cylinder. In addition to requiring a plurality of glass to metal seals, the following disadvantages arise from utilizing a fiber optic plate as the faceplate. Fiber optic plates generally exhibit structural weakness, poor heat resistance and poor hermeticity. Moreover, the size and shape of a fiber optic plate may be such as to render it unsuitable for use as a faceplate. For example, some fiber optic plates must be relatively thin in order to provide optimum optical properties and therefore lack sufficient strength to be used as a faceplate.

Supporting means of the type used to support a shadow mask adjacent to a mosaic screen of phosphor dots in a cathode-ray color tube have been considered as a means for supporting a phosphor coated fiber optic plate adjacent to the cathode ray tube faceplate; however, this type of supporting means, which supports the mask from the sidewalls of the tube envelope near the faceplate cannot support the fiber optic plate the required distance from the faceplate with sufficient accuracy.

SUMMARY OF THE INVENTION

It is therefore an object of the present invention to provide means for supporting a member such as a phosphor coated target, mask or the like a precise distance from the inside surface of a cathode ray tube faceplate.

A more specific object of the present invention is to provide an apparatus for accurately positioning a photochromic fiber optic plate with respect to a lens-shaped cathode ray tube faceplate.

Briefly, the cathode ray tube in accordance with the present invention includes an evacuated envelope having means therein for producing an electron beam and a faceplate for viewing an optical image produced by the beam. A plurality of nonconductive posts having one end thereof affixed to the inner surface of the faceplate each contains a slot in a side thereof into which a peripheral portion of a planar member is disposed so that the planar member is accurately spaced from the inner surface of the faceplate. At least one conductive spring clamp is affixed to the end of at least one of the posts remote from the faceplate for applying a holding force to the planar member and for making electrical contact therewith. Means are provided for applying an electrical potential to the spring clamp.

BRIEF DESCRIPTION OF THE DRAWINGS

FIG. 1 is a view in partial cross-section of a cathode ray tube having a planar member secured adjacent to the faceplate in accordance with the present invention.

FIG. 2 is a cross-sectional view taken along lines 2—2 of FIG. 1 and rotated 90°.

FIG. 3 is an enlarged, cross-sectional view taken along lines 3—3 of FIG. 2.

FIG. 4 is an enlarged, cross-sectional view of a portion of a mounting post and a spring contact assembly.

DETAILED DESCRIPTION

FIGS. 1 and 2 show a conventional cathode ray tube bulb or envelope comprising the usual constricted neck portion 2, flared portion 4 and end portion 6 against which a lens-shaped faceplate 8 is sealed. Although the planar surface of planoconvex faceplate 8 is shown as being exposed to atmosphere, the curved portion could be exposed instead. An electron source 10 is positioned in the constricted portion 2 and may comprise conventional means for providing at least one electron beam represented by the dashed line 12. A contact terminal or anode button 18 provides an electrical connection to an internal conductive wall coating 20.

A planar member such as a phosphor coated target 22 is accurately spaced a predetermined distance from faceplate 8 by a plurality of nonconductive posts 24, 26, 28, 30, 32, 34 and 36, each of which has a slot 38 for receiving an edge of target 22 and a beveled end 40 which is adapted to be secured to the curved inner surface of faceplate 8. These posts are preferably made from a glass or glass-ceramic material since such a material does not outgas, the thermal coefficient of expansion thereof can easily be matched to that of the faceplate glass, and solder glass readily adheres thereto. Since the distance between the target 22 and faceplate 8 must be accurately controlled, no bonding material should be located between the posts and the faceplate. The mounting posts are therefore first cleaned thoroughly with liberal amounts of trichloroethylene, acetone and alcohol, respectively and then positioned directly onto the faceplate by using a dummy substrate of correct dimensions and expansion coefficient or by some other holding device. Glass solder 42 is then placed around the base of all of the posts except post 36 and a small portion 43 of solder glass is disposed on the tops of posts 24 and 32. Post 36 is left unattached at this time so that the dummy target can be replaced by the actual target 22. This assembly is placed in a furnace and baked at 440° C for 1 hour. The temperature should be increased to 440° C at a rate of about 10° C per minute. After the 1-hour bake at 440° C, the temperature is decreased to 350° C at a rate of about 1 ½° C per minute and thereafter reduced to room temperature at a rate of about 6° C per minute. The expansion coefficients of the target and faceplate are such that a small space is left in the slots 38 after cooling, thus permitting the easy removal of the dummy substrate from the posts which are now sealed to the faceplate.

A solder glass is selected which has a thermal coefficient of expansion that is compatible with that of the faceplate glass. A lead-zinc-borate glass of the type described in U.S. Pat. No. 2,889,952 issued to S. A. Claypoole may be used.

A cross-sectional view of a portion of the target 22 is shown in FIG. 3. The target consists of a photochromic fiber optic plate 44 on which there is deposited a dichroic layer 46, a phosphor layer 48 and an aluminum layer 50. The phosphor layer 48 does not extend to the periphery of the target, and a peripheral portion 52 of the aluminum layer is deposited directly on dichroic layer 46.

Two spring clip assemblies 60 and 62 are employed to provide electrical contact between the phosphor layer 48 and the conductive coating 20 on the inside of the tube envelope. An enlarged view of assembly 62 is shown in FIG. 4. Each of the spring clip assemblies consists of two spring contacts 64 and 66 which are welded to a small pad 68 of a metal such as a nickel-copper-chrome alloy which has a coefficient of thermal expansion similar to that of the post glass and which readily seals to soft solder glass. Each of the pads 68 has a small hole 70 of approximately 0.05 inch in diameter near its center. The spring clip assemblies 60 and 62 are affixed to their respective posts 24 and 32 by placing pads 68 on the posts with the holes 70 near the center of the posts and thereafter heating the posts and the small portions 43 of solder glass with a small torch until the solder glass becomes molten and flows up through the holes. The solder glass is then flame annealed and allowed to cool.

After the dummy substrate is removed and the spring clip assemblies are affixed to posts 24 and 32, the target 22 may be inserted into the slots 38. Contacts 64 rest on the aluminum coated peripheral portion 52 of the target and provide electrical contact as well as hold the target in its proper place. If desired, the remaining post 36 may be affixed to faceplate 8 in a manner similar to that by which the other posts were attached. Since contacts 64 apply a retaining force to the target, post 36 may be omitted, especially if the cathode ray tube is to be mounted in such a manner that posts 28 and 30 are located at the bottom of target 22 during use. The envelope end portion 6 may now be lowered onto faceplate 8 and glass soldered thereto in a conventional manner. Contacts 66 are biased against the conductive coating 20, thereby completing the electrical connection between the coating 20 and target 22.

After the faceplate is sealed to the envelope end portion 6, the entire cathode ray tube is placed in a vacuum system and a layer of conductive material such as aluminum is evaporated onto flared portion 4, end portion 6, target 22 and that part of faceplate 8 that is not in the shadow of the target. Since the envelope walls and the target were previously coated with conductive material, for the sake of clarity the only conductive layer illustrated as resulting from this process is layer 72 on faceplate 8. Aluminum layer 72 provides a reflecting surface on that part of the faceplate not occupied by target 22. This reflecting surface aids in bleaching photochromic glass in the target 22. The aluminum layer also insures good electrical contact between the anode pin 18 and the conductive coating 20.

The fiber optic plate 44 is made up of many very fine individual fiber elements which are joined by fusion in side-by-side relation with each other, the ends of these fibers forming two planar surfaces of the plate 44. Each of the fiber elements consists of a core member of a light transmitting medium having a relatively high index of refraction surrounded by a relatively thin cladding of glass having a relatively low index of refraction. The cores of the fibers are made from photochromic glass, which has the property of becoming less transparent when irradiated with blue or ultraviolet light, remaining unaffected by green light and becoming more transparent when irradiated by infrared, red or orange light. The characteristics and production of such glass are described in U.S. Pat. No. 3,208,860 granted to W. H. Armistead and S. D. Stookey on Sept. 28, 1965. The cladding glass may consist of that which is taught in U.S. Pat. No. 2,382,056 granted to H. P. Hood on Aug. 14, 1945.

The dichroic layer 46 transmits ultraviolet light having a wavelength around 350 nm and reflects light having a wavelength above 450 nm. The layer 46 is typically multilayered and may be formed by well-known evaporating techniques. Phosphor layer 48 is selected for the wavelength of light which it radiates when excited by the electron beam. The light radiated by the phosphor is preferably ultraviolet light which passes through dichroic layer 46 and darkens those photochromic fibers 54 on which it impinges. Selected portions of the photochromic fiber optic plate 44 may be darkened by controlling the position and intensity of the electron beam to write and store information therein.

Referring to FIGS. 1 and 3, information stored in the target 22 is read therefrom by directing onto faceplate 8 a beam of green light represented by the arrows 76. This probing light is focused by the lens-shaped faceplate onto fibers 44, passes through the fibers, reflects from dichroic layer 46 and again passes through fibers 44. The resultant image may be projected by a lens system which includes faceplate 8. Mounting the target 22 to the faceplate 16 in the manner disclosed herein provides the accurate positioning that is necessary to insure that the target is properly centered with respect to the faceplate and properly spaced therefrom, thus permitting the accurate positioning of the target in the optical system.

We claim:
1. A cathode ray tube comprising
   an evacuated envelope,
   means in said envelope for producing an electron beam,
   a faceplate forming part of said envelope,
   a planar member disposed adjacent the inner surface of said faceplate,
   a plurality of nonconductive posts having a first end affixed to the inner surface of said faceplate and a second end remote from said first end, each of said posts having a slot in a side thereof into which a peripheral portion of said member is disposed,
   at least one conductive spring clamp affixed to at least one of said posts, said clamp applying a retaining force to said member and making electrical contact therewith, and
   means for applying an electrical potential to said clamp.

2. A cathode ray tube in accordance with claim 1 wherein a conductive coating is disposed on a portion of the inner surface of said evacuated envelope, and said means for applying an electrical potential to said clamp comprises a conductive pad affixed to said at least one post, said clamp being electrically connected to said pad, and conductive spring contact means connected to said pad and contacting said conductive coating.

3. A cathode ray tube in accordance with claim 2 wherein a hole extends through the central portion of said pad and said pad is affixed to said at least one post by solder glass which is disposed between said pad and said at least one post and extends into said hole.

4. A cathode ray tube in accordance with claim 3 wherein said posts consist of glass having a thermal coefficient of expansion which is compatible with that of said faceplate.

5. A cathode ray tube in accordance with claim 4 wherein said posts are in direct contact with said faceplate and are secured thereto by solder glass which surrounds said first ends of said posts.

6. A cathode ray tube in accordance with claim 5 wherein said faceplate is lens-shaped.

7. A cathode ray tube in accordance with claim 6 wherein said planar member is a fiber optic plate having a layer of phosphor disposed on that surface thereof which is remote from said faceplate.

8. A cathode ray tube in accordance with claim 7 wherein said fiber optic plate comprises a plurality of fibers in side-by-side relation with each other, the ends of said fibers forming two planar surfaces, each fiber consisting of a core of photochromic glass having a given index of refraction surrounded by a cladding of glass having an index of refraction lower than that of said core.

9. In a cathode ray tube of the type including an envelope having a longitudinal axis, means at one end thereof for generating at least one electron beam, a faceplate in said envelope remote from said one end, a coating of conductive material disposed on a portion of the inner surface of said envelope, a planar member disposed adjacent to said faceplate and extending across said axis in a position to be scanned by said electron beam, and means for supporting said member in accurately spaced relationship with respect to said faceplate, said supporting means comprising in combination:
   a plurality of nonconductive posts having a first end affixed to the inner surface of said faceplate and a second end remote from said first end,
   a slot in each of said posts into which a peripheral portion of said member is disposed,
   at least one conductive pad having a coefficient of expansion compatible with that of said posts affixed to the second end of at least one of said posts,
   a first conductive spring clamp affixed to said pad and extending to a peripheral portion of said member, thereby applying a holding force thereto and making electrical contact therewith, and
   a second conductive spring clamp affixed to said pad and contacting said conductive coating.

10. A cathode ray tube in accordance with claim 9 wherein said posts consist of glass having a coefficient of expansion which is compatible with that of said faceplate, the first ends of said posts being in direct contact with said faceplate and being secured thereto by solder glass which surrounds said first end, a hole in the central portion of said pad, a layer of solder glass disposed between said pad and the second end of said post and extending into said hole.

* * * * *